Aug. 7, 1934.    E. W. SMITH ET AL    1,969,675
PREPAYMENT MECHANISM FOR GAS AND SIMILAR METERS
Filed May 2, 1933    7 Sheets-Sheet 7

Inventors
E. W. Smith.
A. Charles.
by
W. E. Evans
Attorney.

Patented Aug. 7, 1934

1,969,675

UNITED STATES PATENT OFFICE 1,969,675

PREPAYMENT MECHANISM FOR GAS AND SIMILAR METERS

Ernest William Smith and Arthur Charles, London, England

Application May 2, 1933, Serial No. 668,950
In Great Britain May 2, 1931

10 Claims. (Cl. 194—72)

This invention relates to coin controlled prepayment mechanism for gas and similar meters, and especially to prepayment mechanism for prepayment meters adapted for operation by coins of more than one value or size without any adjustment being necessary to render it operable by either or any of the coins of different value or size.

According to the invention, coin controlled mechanism for gas and similar meters adapted for automatically selective operation by coins of more than one value is provided with an epicyclic gear to transmit movement from the coin holder mechanism to the quantity mechanism, which epicyclic gear in itself and without the aid of additional gearing exterior to the sun wheels gives the required reduction ratios for the several values or sizes of coin with which the coin freed mechanism is adapted to operate.

According to the invention, moreover, measuring wheels are provided corresponding to the values of the coins with which the prepayment mechanism is adapted to operate, and the respective measuring wheels may be respectively provided with a sun wheel and sun pinion which are co-axial and independent, while a corresponding integral or connected co-axial planetary wheel and planetary pinion in engagement respectively with the sun pinion and sun wheel are mounted upon a planetary cage or the equivalent, the planetary cage being adapted to rotate upon the common axis of the sun wheel and sun pinion. The complete rotation of the cage may be effected on the operation of the mechanism by a coin of a higher value, while partial rotation of the cage may be effected in the operation of the mechanism by a coin of a lower value, the planetary cage being also adapted for complete rotation by successive operation with coins of lower value to the number corresponding to the coin of higher value by which the planetary cage may also be rotated in a single operation of the coin holder.

According to the invention, moreover, a member or an arm may be provided to be relatively rotatable with respect to the planetary cage and to carry two pinions of an epicyclic gear which may respectively engage two juxta-posed toothed wheels through which the movement of the planetary cage is transmitted to the valve-operating gear.

According to the invention, again, the juxtaposed toothed wheels may be provided as crown wheels and may engage two pinions carried by the member or arm relatively movable with respect to the planetary cage or the spindle thereof, each of the two pinions engaging each of the toothed wheels.

According to the invention, moreover, the member or arm before referred to may be mounted upon a spindle which is directly or indirectly connected with and forms the driving member for a valve operating disc or the equivalent which is thus rotated from the said member or arm to open or close the valve according to the direction of rotation of the member or arm as determined by the coin holder or by the meter mechanism.

According to the invention, moreover, the valve operating spindle or the like which is rotated from the coin holder by the mechanism such as that hereinbefore described may carry a crank pin and cooperating stop member adapted to transmit rotation to the valve operating disc or the like through a Maltese cross device which is co-axial with and in fixed relation to the valve disc or the like which is mounted upon a spindle parallel with the spindle of the said member or arm. By such means the advantage of repeated operation of the coin holder mechanism to cover a large range of prepayment is secured.

According to the invention, moreover, in a coin holder suitable for operating with the mechanism described, a striker plate or the equivalent carrying the engaging pawl or striker may be mounted within the coin holder and be adapted on the insertion of a coin to have a lengthwise movement as well as a transverse movement towards or away from the measuring wheels, whereby the pawl or striker may recede from one of the measuring wheels before taking up a position to engage the other. Thus, the measuring wheel of larger diameter may be adapted to be operated by a shilling, and that of smaller diameter by a penny, but the mechanism is not adapted to permit of the engagement of either of the measuring wheels by the use of a halfpenny nor of any other coin of a size different from those by which the mechanism is intended to be operated.

According to the invention in a modified construction of the coin freed mechanism, one or other of the measuring wheels may be adapted for selective movement by one of the coins with which the coin mechanism is adapted to operate and to transmit the drive through the reducing gear, while upon the use of another coin with which the coin mechanism is adapted to operate, a drive is transmitted from the measuring wheels through the reducing gear as a direct drive, that is to say, with a 1:1 ratio. Such a mechanism is adapted to operate with a coin holder mechanism which according to the value of the coin inserted effects selective engagement of one of the measuring wheels, or alternatively locks the measuring wheels to move as a unit.

According to the invention, moreover, in a construction of coin holder suitable for use with the modified prepayment mechanism, the striker plate or the equivalent which is actuated on the insertion of a coin may be adapted to have imparted to it an inward or transverse movement with reference to the axis of rotation of the coin holder in the use of a smaller coin, such as a shilling, by which a tooth at the upper end of the striker plate or the equivalent may engage the quantity wheels; while alternatively the striker plate or the equivalent is adapted to have an additional pivotal movement on the insertion of a larger coin, such as a penny, whereby a tooth at the opposite end of the striker plate or the equivalent may engage one of the quantity wheels. By such means one and the same coin holder and one and the same striker plate or its equivalent may be used for coins of more than one size and value.

According to the invention, moreover, the coin mechanism so provided may be so constructed that when a coin, such as a halfpenny, of a size intermediate the sizes of those by which the mechanism is operable as aforesaid is employed, the extent of the pivotal movement imparted to the striker plate or the equivalent in the use of such a coin is such that the striker plate or the equivalent can engage neither of the quantity wheels, so that thus the mechanism is in a simple way rendered inoperable by such a coin.

In another construction of coin holder according to the invention, suitable for use with the modified coin-control mechanism, the price-changing disc upon which the coin-actuated mechanism is mounted is provided in determined position corresponding to that at which the coin holder is set at the commencement of its movement, with separate and adjacent slots for the coins of different values by which the mechanism is to be operated, and the coin holder is provided with separate strikers for actuation by the respective coins, the strikers being mounted in adjacent positions and being adapted so that the striker corresponding to the coin of smaller value is independently operable, while the striker corresponding to the coin of higher value when actuated causes the actuation of the other striker, so that thus both the adjacent quantity wheels are engaged on the introduction into the coin holder of a coin of higher value.

According to the invention, moreover, the coin pockets are so provided that while the pocket for the coin of lower value is such that the coin cannot be displaced from its position in the pocket on the clockwise movement of the coin holder, the coin pocket for the coin of higher value is open to the adjacent pocket of the coin of lower value, so that thus in the clockwise rotation of the coin holder after the insertion for example of a shilling, the coin does not remain parallel with the coin pocket, but on being thrust outwards by means of the helical spring to which the striker is subject, engages with the inner periphery of the coin holder casing and as the coin holder is rotated clockwise the coin is thus tilted to an angle whereby the outer edge of the coin comes to rest against the side of the adjacent penny pocket. In this operation the quantity wheels are both rotated to the same extent as would the quantity wheel when engaged by the single striker on actuation by a coin of lower value. Thus the strikers are disengaged from the respective quantity wheels at exactly the same position as is the single striker when actuated by a coin of lower value. In this way the shilling is released at the same position as a penny to pass through the same discharge slot provided in determined position in the lower part of the casing to drop into the coin receptacle beneath.

According to the invention, moreover, the coin pocket or coin space adapted to receive the large coin may have one of the walls lying normal to the coin slot formed by a movable element mounted under spring action and of such form that normally it presents an inclined or grooved surface as the wall of the coin pocket or coin space, such that on the introduction of a small coin the depression of the said element is insufficient to ensure a stable position of the coin, with the result that under spring action the element functions to reject the coin from the coin slot, while on the introduction of a coin of the size for which the coin slot is intended the said element is depressed to an extent to render the spring action no longer effective to reject the coin.

According to the invention, also, the movable or ejector element is advantageously provided to be pivoted upon an axis transverse to and adjacent one end of the coin slot adapted to receive a large coin, and in its normal position is maintained, under the action of a spring, with an inclined or curved face partly obstructing the entry of a coin into the coin pocket or coin space.

Where it may be desirable with reference to the modified construction of coin-controlled mechanism to use a coin holder in which the measuring wheels are independently engaged by the respective strikers, according to the invention a ratchet or free wheel device may be interposed between the respective quantity or measuring wheels or the parts on which they are mounted, in such manner that while one quantity or measuring wheel may be engaged by actuation of the coin mechanism in the use of a coin of smaller value, such as a penny, without its movement being imparted to the other quantity or measuring wheel, that quantity or measuring wheel is not directly operated when the coin mechanism is actuated in the use of a coin of higher value, but is moved forward by the ratchet or free wheel device on the rotation of the quantity or measuring wheel to which movement is imparted in the use of a coin of higher value.

The invention further comprises the features hereinafter described.

The invention is illustrated by way of example in the accompanying drawings.

It is to be observed that in view of the large number of figures included in the accompanying drawings, the reference letters in each group of figures are independent of those of other groups of figures.

Figure 1:
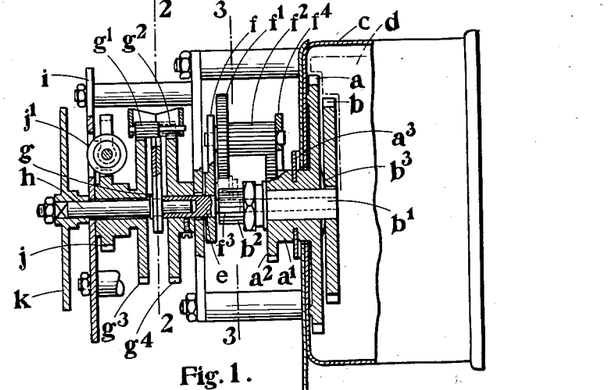
Figure 1 is a sectional elevation of a mechanism according to the invention.
Figure 2:
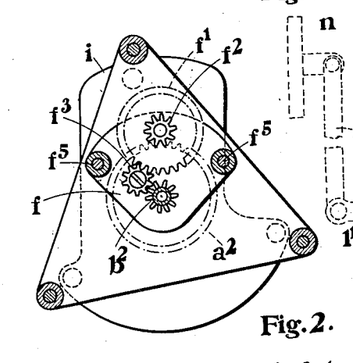
Figure 2 is a cross-section on the line 2—2 of Figure 1.
Figure 3:
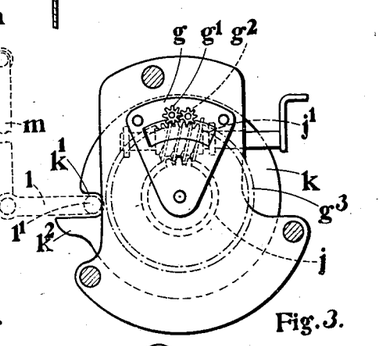
Figure 3 is a cross-section on the line 3—3 of Figure 1.

In carrying the invention into effect in its application to coin controlled mechanism, as illustrated in Figures 1 to 3, the measuring wheel $a$ that is adapted for selective operation by a coin of higher value is mounted upon a tubular sleeve $a^1$ set within a seating concentrically provided in the end wall of the cylindrical casing $c$ containing the coin holder $d$, and this tubular sleeve is extended to the rear to carry on its rearwardly extending end a toothed sun wheel $a^2$. The measuring wheel $b$ that is adapted for selective operation by the coin of lower value is adapted to be mounted concentrically upon a tubular spindle or sleeve $b^1$ and this second tubular sleeve is mounted within the first tubular sleeve $a^1$ referred to and has mounted upon its rearward end a toothed sun pinion $b^2$ in position adjacent the toothed sun wheel $a^2$ on the first or surrounding tubular sleeve $a^1$. The rearward end of the inner or second tubular sleeve $b^1$ is adapted for the reception of the end of a spindle $e$ by which movement is transmitted to the valve operating mechanism and upon which may be mounted the planetary cage $f$.

The planetary cage has mounted upon it the toothed planetary wheel $f^1$ and planetary pinion $f^2$ integrally formed or connected together so as to rotate together upon the same axis, the planetary pinion $f^2$ engaging with the toothed sun wheel $a^2$ and the planetary toothed wheel $f^1$ engaging indirectly with the sun pinion $b^2$ through a freely mounted pinion $f^3$ carried by the planetary cage. The gear ratios are chosen in accordance with the values of the coins with which the mechanism is to operate. Thus, when the smaller measuring wheel $b$ is operated the sun pinion $b^2$ has a corresponding movement imparted to it, whereby the intermediate freely mounted pinion $f^3$ carried by the planetary cage $f$ is rotated, thereby causing the rotation of the planetary toothed wheel $f^1$ and planetary pinion $f^2$. The partial rotation of the planetary cage $f$ is thus effected as well as the partial rotation of the spindle $e$ through which movement is imparted to the differential gear serving as the quantity mechanism. Similarly when the larger measuring wheel $a$ is selectively operated in the use of a coin of a higher value the sun toothed wheel $a^2$ is rotated, thereby causing the rotation of the planetary pinion $f^2$ and planetary toothed wheel $f^1$ to a correspondingly greater extent. In this way the planetary cage $f$ may be rotated in the operation of the coin holder by a coin of higher value through a considerable part of a complete revolution, while the planetay cage $f$ is rotated substantially to the extent of one-twelfth part of that movement on the single operation of the coin holder in the use of a coin of lower value in the manner hereinbefore described, it being understood that on the successive use of twelve coins of lower value the planetary cage may be rotated in the same manner and to the same extent as when a coin of higher value is used in a single operation of the coin holder. In this way movement may be imparted from the plentary cage to the differential gear serving as the quantity mechanism without employing different sets of gear trains.

It will be understood that by the use of spring washers $a^3$, $b^3$ a certain amount of friction is imposed upon the respective measuring wheels or upon the parts to which they are connected so that thus either the sun wheel $a^2$ or the sun pinion $b^2$ is held stationary when the sun pinion $b^2$ or the sun wheel $a^2$ is respectively operated. The spring washer $a^3$ may serve also to maintain the measuring wheel $a$ and its associated parts in position relatively to the casing $c$.

The planetary cage may be constructed in any convenient manner. Thus, as illustrated in the drawings, for example, it comprises a plate $f$ mounted at or near the end of the transmission spindle $e$ and this spindle is shaped or provided so that its end may be inserted for support within the inner tubular sleeve $b^1$. The cage may be completed by the provision of a segmental-shaped plate $f^4$ disposed parallel with the plate $f$ before referred to and connected thereto by two or more pins $f^5$ disposed parallel with the axis of the cage. The intermediate pinion $f^3$ is advantageously supported by the planetary cage by means of a short spindle or pin or by a separate bracket or by a bracket integrally formed on one of the respective plates of which the cage is constituted.

While the gear ratio of the sun and planetary wheels and pinions may be determined to give a supply of gas corresponding to coins such as a shilling and a penny, the ratio may be determined to suit coins of other values and to yield proportionate quantities of gas or another commodity corresponding to those values, while furthermore the construction of the respective parts carrying the sun toothed wheel and sun pinion may be modified according to practical requirements.

A member or an arm $g$ is fixedly mounted upon a spindle $h$ which at the one end finds a bearing in the end of the spindle $e$ and is also supported in the end frame plate $i$. The member $g$ is provided at the outer end with a cage to carry two pinions $g^1$, $g^2$, the latter of which has a smaller number of teeth than the former, which pinions respectively engage two juxta-posed toothed wheels $g^3$, $g^4$ and with the said wheels form an epicyclic differential gear. The respective toothed wheels $g^3$, $g^4$ of the epicyclic differential gear are co-axial with the planetary cage $f$, and the second of the toothed wheels $g^3$ may be mounted upon the same tubular spindle as a worm wheel $j$ by which movement may be imparted through a worm $j^1$ from the meter for the return movement of the mechanism and for the closure of the valve. The first of the two toothed wheels $g^4$ is mounted upon the spindle $e$, and rotates with the planetary cage $f$. In the construction represented in Figures 1 and 3 of the drawings the spindle $h$ carries at its outer end a valve operating disc $k$ which cooperates with an arm $l$ fixedly mounted on the pivotal axis of the lever or arm $m$ by which the valve $n$ is carried. For this purpose the disc is formed with a radial slot $k^1$ in which is adapted to be received a transverse pin or roller $l^1$ supported by the arm $l$. The disc is further formed with a projecting finger $k^2$ which serves to act upon the pin or roller $l^1$ for the purpose of closing the valve.

In the rotation of the planetary cage $f$ the arm $g$ carrying the pinions $g^1$, $g^2$ of the epicyclic differential gear rotates with the cage. The respective pinions $g^1$, $g^2$ are mounted near the outer end of the arm and engage one with the other, and one pinion $g^1$ engages the toothed wheel $g^3$, while the other $g^2$ is provided to engage the toothed wheel $g^4$. Upon the insertion of a coin into the holder and the rotation of the coin holder to deliver the coins into the receptacle, according to the size of the coin used so one or other of the measuring wheels $a$, $b$ is rotated and the planetary cage is given a movement depending upon the size of the coin. This movement is transmitted by way of the toothed wheel $g^4$ and the pinions $g^1$, $g^2$ to the arm $g$ which thus rotates the disc $k$ which effects the opening of the valve by depressing the arm $l$. The drive from the meter mechanism which is received through the worm $j^1$ is transmitted by the worm wheel $j$ to the toothed wheel $g^3$ and thus by way of the pinions $g^1$, $g^2$ to the arm $g$, but in the opposite direction to that imparted from the coin holder with the result that the disc $k$ is rotated in the reverse direction for the closure of the valve.

Figures 4, 5:
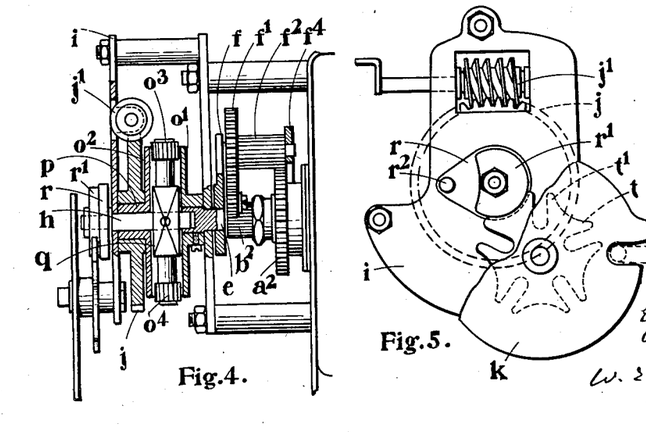
Figure 4 is a sectional elevation of a modified construction of mechanism according to the invention.
Figure 5 is an end view of the mechanism shown in Figure 4.

In the construction represented in Figures 4 and 5 the differential gear between the epicyclic reducing gear and the valve operating disc is modified to the form of a gear comprising two crown wheels $o^1$, $o^2$ which are respectively secured to the spindles $e$ and to a sleeve $p$ and a radially disposed pinion carrier $q$ upon which are mounted pinions $o^3$, $o^4$ engaging the crown wheels $o^1$, $o^2$. The carrier $q$ is mounted upon the spindle $h$, which at one end is seated in a bearing formed in the end of the spindle $e$. The sleeve $p$ serves also to carry fixedly mounted thereon a worm wheel $j$ adapted to engage the worm $j^1$. The worm wheel $j$ and crown wheel $o^2$ may, however, be formed integrally. The other end of the said spindle which extends through the frame plate $i$ is adapted to carry a crank plate $r$ having a segmental boss $r^1$ whose periphery has a circular shape and a crank pin $r^2$, the boss $r^1$ having a circular recess disposed opposite to the crank pin $r^2$. The crank pin $r^2$ and the segmental boss $r^1$ are adapted to co-operate in the rotation of the crank plate with a Maltese cross element $t$ formed with a series of equi-distant cavities of circular curvature corresponding to the curvature of the segmental boss and intermediate radial slots $t^1$, into which slots the pin $r^2$ successively engages upon the rotation of the said crank plate $r$, thereby causing intermittent and quick movement of the valve operating disc for the opening or closing of the valve, it being understood that on the crank plate rotating in the one direction, as determined by the rotation of the coin holder, the disc $k$ is rotated to open the valve, while on the rotation in the opposite direction from the worm deriving movement from the meter the valve disc $k$ is rotated to close the valve.

It will be understood that the Maltese cross gear whereby the operation of the valve disc $k$ is effected intermittently may be applied in mechanism as described with reference to Figures 1 to 3 and in mechanisms other than those hereinbefore described.

The epicyclic gear by which movement may be transmitted from the planetary cage to the valve operating mechanism, and the valve operating mechanism by which movement is imparted to the valve are comprised within the invention, but these respective parts which may be replaced by other mechanism of equivalent character and having substantially the same functions and effects.

It will furthermore be understood that by the intermittent actuation of the valve operating gear, the valve may be opened adequately in the single operation of the mechanism with a coin of lower value and that too when the price changing disc is set at a low or minimum figure.

It will furthermore be understood that means may be provided for limiting the number of coins which may be introduced into the meter at one and the same time or for limiting the amount of gas or other commodity for which prepayment may be made. Such means may comprise a toothed wheel or segment mounted upon a spindle of the mechanism that is related to the valve-operating gear, that is to say, for example, there may be provided a toothed wheel upon the spindle of the valve-operating disc which toothed wheel may operate a quadrant which serves to move an obturator adapted to be brought into position below the coin discharge outlet of the coin holder casing in the manner hereinafter described. A prepayment indicator may also be provided which is operated from the same quadrant.

The invention is applicable in conjunction with any suitable form of coin holder mechanism adapted to effect selective operation of the measuring wheels provided according to the size or value of the coin inserted into the coin holder.

Figure 6:
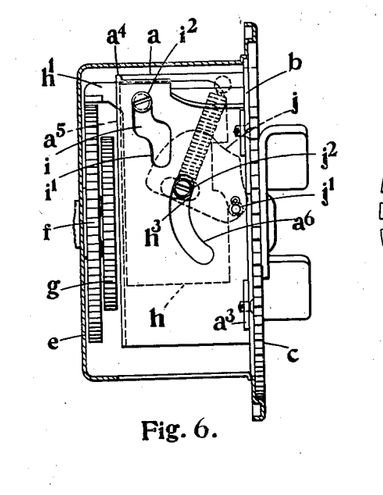
Figure 6 is a side elevation of a coin holder suitable for use with the mechanism represented in Figures 1 to 5.
Figure 7:
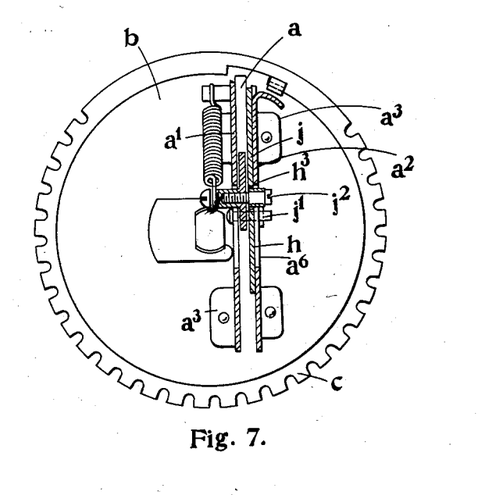
Figure 7 is a transverse section through the coin holder.
Figure 8:
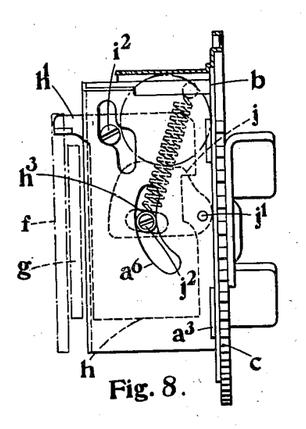
Figure 8 shows the coin holder in side elevation and illustrates the disposition of the parts upon the insertion of a coin of the smaller size with which the coin holder is adapted to operate.
Figure 9:
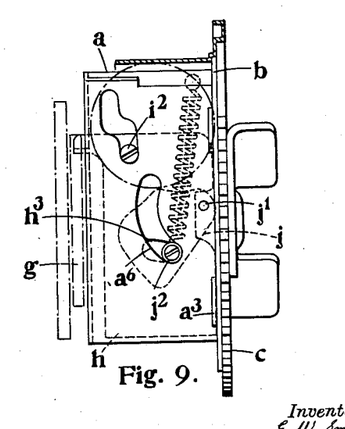
Figure 9 is a similar view of the coin holder illustrating the disposition of the parts on the insertion of a coin of the larger size with which the coin holder is adapted to operate.

In a suitable construction of coin holder, as illustrated in Figures 6 to 9 of the accompanying drawings, the coin holder $a$ is carried upon a rotatable disc $b$ secured on the inner face of the price changing disc $c$ that is adapted in known manner to close an open-sided cylindrical casing $e$ within which the respective measuring wheels $f$, $g$ are mounted upon its inner wall in such manner that where two are employed by which the mechanism is alternatively operable by coins of different values such as a penny and a shilling, a pawl or striker $h^1$ of a striker plate $h$ is disposed adjacent the measuring wheels $f$, $g$, the arrangement being such that on the insertion of a shilling into the coin space in the coin holder $a$, the striker plate or the equivalent $h$ is caused to move lengthwise so that the pawl or striker $h^1$ engages the teeth of the larger measuring wheel $f$, as illustrated in Figure 8, while as illustrated in Figure 9 when a penny is inserted the striker plate or the equivalent $h$ is moved lengthwise and recedes, whereby it is sharply withdrawn from contact with the larger measuring wheel $f$ and is brought into position to engage the smaller measuring wheel $g$ which lies in a position in front of the larger measuring wheel.

The coin holder $a$ is advantageously formed by two plates $a^1$, $a^2$ of substantially symmetrical form set normal to and diametrically in parallel positions across the inner face of the rotatable disc $b$, and each plate is secured to the rotatable disc $b$ conveniently by means of outwardly extending lugs $a^3$, while one or both of the plates at the outer end is or are bent at right angles to form an outer end wall $a^4$ within which slots (not shown) are provided within which may engage lugs formed at the outer edge of the other plate. The end wall is provided with a lengthwise slot $a^5$ at a position adjacent the plate of the side wall with which it is integrally formed, and the pawl or striker $h^1$ that is formed as an outwardly extending arm integral with the striker plate or the equivalent $h$ is able to move in the slot $a^5$ to the extent determined by the inserted coin, and in the manner hereinbefore described the pawl or striker $h^1$ may recede to extend only slightly, but sufficiently to engage the measuring wheel $g$ of smaller diameter on the insertion of the larger coin.

A pair of lengthwise slots or the equivalent $i$, $i^1$ are disposed one above the other, and have their respective ends disposed parallel to each other, the ends of the respective slots being connected together by an inclined middle part, so that thus as the striker plate or the equivalent is moved lengthwise on the insertion of a coin, a pin or stud $i^2$ on the striker plate or the equivalent and engaging the said slots causes the striker plate or the equivalent to move transversely as the pin moves relatively in the inclined parts of the respective slots. Thus, in the use of a coin of larger size than a shilling, the upper end of the striker plate or the equivalent first moves radially, then recedes, and finally moves radially to engage the smaller measuring wheel.

The pivoted contact member $j$ provided as hereinbefore described is set in position between the striker plate $h$ and the opposite plate or side wall $a^1$ of the coin holder, and may be carried upon a pin $j^1$ passing transversely through the respective plates or side walls. A pin $j^2$ carried by the contact member $j$ extends through a transverse slot $h^3$ in the striker plate or the equivalent and through an arcuate slot $a^6$ formed in the wall $a^2$ of the coin holder about the pin $j^1$ as a centre. By such means a coin holder of simple construction is provided that is adapted for actuation by coins of two different values without any adjustment being necessary, the selection of the measuring wheels being effected on the insertion of one or the other of the determined coins. By the provision of a pivoted contact member through which movement is imparted to the striker plate or the equivalent on the insertion of the coin into the coin holder, the striker plate is readily moved without any great stress being needed to bring it down to engage the crown or measuring wheel.

It will be understood that the upper end of the coin holder is advantageously open so that the edge of the coin may contact with the inner face of the circumferential wall of the casing, whereby the coin may thus engage with recesses in the circumferential wall of appropriate form in known manner, by which the return movement of the coin holder may be prevented until the coin is discharged on the completion of its rotation to the determined extent.

Figure 10:
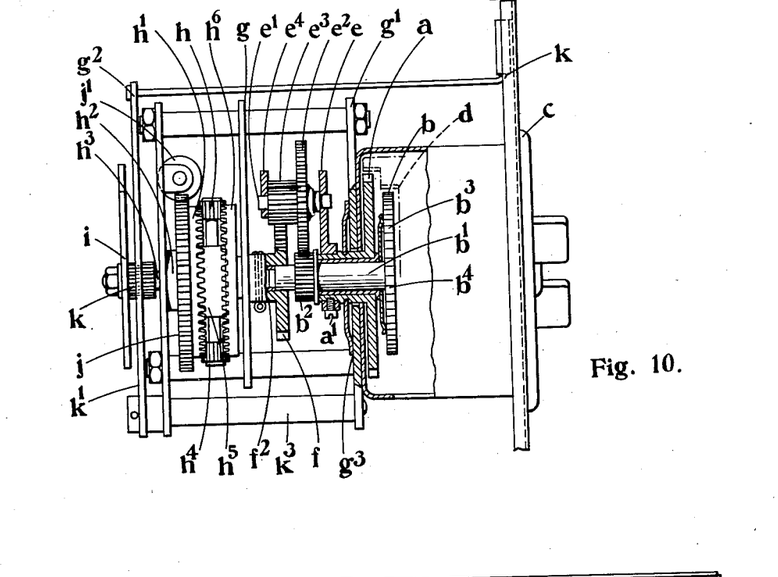
Figure 10 is a side elevation partly in section of a modified form of coin controlled mechanism.
Figure 11:
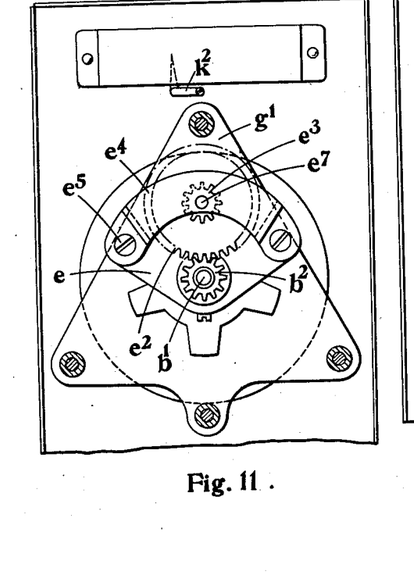
Figure 11 is a cross-sectional view of the mechanism shown in Figure 10 taken in rear of the reducing gear.
Figure 12:
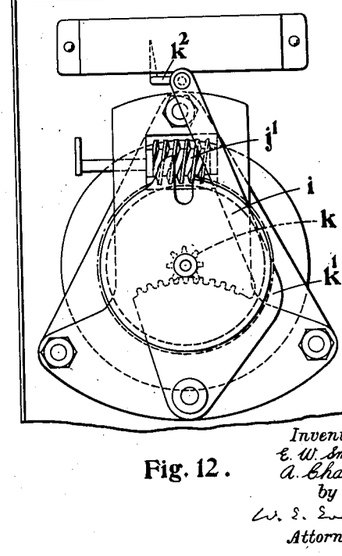
Figure 12 is an end elevation of the mechanism shown in Figure 10.

The coin-control mechanism illustrated in Figures 1 to 5 of the drawings may be modified so that the drive in one case is through the reducing gear while in the other case a drive with a 1:1 ratio may be secured. Such a construction is illustrated in Figures 10 to 12. Two co-axial measuring wheels $a$, $b$ are mounted within a cylindrical casing $c$ containing the coin holder $d$, and one or other of the measuring wheels is adapted for selective operation by one of two coins, such as a penny and a shilling. For this purpose one measuring wheel $b$ is mounted upon a spindle $b^1$ extending rearwardly through the end wall of the cylindrical casing $c$ of the coin holder, and on its outwardly protruding end a pinion $b^2$ is mounted, through which pinion movement is imparted to the quantity or valve operating mechanism through a reducing gear. The spindle $b^1$ is mounted within a liner or loosely fitting sleeve $b^4$ which is disposed within a tubular sleeve $a^1$ which passes through the end wall of the cylindrical casing $c$ and has mounted on the inner end the second measuring wheel $a$, while upon the rearwardly extending end of the tubular sleeve there is mounted a segmental plate or arm $e$ serving as a gear disc or carrier that is adapted to support a spindle $e^1$ disposed parallel with the spindle $b^1$ and upon which is mounted a toothed wheel $e^2$ and pinion $e^3$ of the reducing gear that are secured to the spindle or otherwise rendered integral to rotate together, means being provided such as a plate $e^4$ by which the outer end of the spindle $e^1$ is supported from the plate $e$ by pins or screws $e^5$. The toothed wheel $e^2$ engages the pinion $b^2$ on the spindle $b^1$ of the measuring wheel $b$, while the pinion $e^3$ engages with a toothed wheel $f$ upon a second or intermediate spindle $f^1$ mounted to the rear of the spindle $b^1$ and co-axial therewith, the said spindle $f^1$ being conveniently supported by a transversely disposed frame plate $g$ that is suitably carried from the rear of the cylindrical casing $c$ as from the frame plate $g^1$, while a further transversely disposed supporting plate $g^2$ is supported at the rear to carry the differential or quantity mechanism in position between the said plate $g^2$ and the plate $g$.

The spindle $b^1$ is reduced at its rear end to permit entry within a central cylindrical cavity formed in the adjacent end of the intermediate spindle $f^1$ or within the toothed wheel $f$ that may be integrally formed or secured to the said spindle $f^1$.

The liner or loosely fitting sleeve $b^4$ is provided at the inner end with a flange against which may abut a spring plate or washer $b^3$ that is adapted to engage the rear face of the measuring wheel $b$ so that a certain degree of pressure may be imposed by which relative rotation of one or other of the measuring wheels is avoided upon the other being actuated. For this purpose a spring plate or washer $g^3$ may be mounted upon the tubular sleeve $a^1$ to the rear of the frame plate $g^1$, the outer ends of which may contact with the rear face of the said plate. It will be understood that the respective spring plates or washers may be anchored to the cylindrical casing $c$ or other means provided to ensure the application of sufficient friction to avoid rotation of one measuring wheel when the other is actuated.

Movement is imparted by the toothed wheel $f$ upon the intermediate spindle $f^1$ from the reducing gear to a differential gear mounted to the rear thereof, it being understood that the ratio of the gear wheels may be determined according to the value of the coins for which the mechanism is intended to be operated. For example, a ratio of 12:1 may be used in a mechanism designed to be operated alternatively with a penny and a shilling. Thus, when an attempt is made to effect the operation of the mechanism by means of a coin of a different size to that by which the mechanism is designed to be operated, the striker or coin-operated lever does not engage with either of the measuring or crown wheels. The coin holder mechanism employed is preferably adapted selectively to operate one of the measuring wheels, that is to say, the measuring wheel $b$ alone or to lock the measuring wheels $a$ and $b$ together to secure the direct drive or 1:1 ratio of movement from the measuring wheels to the quantity mechanism. Any suitable coin holder mechanism may be used, such as those which are hereinafter described. Thus, in the operation of the mechanism a striker may engage in the measuring wheel $b$ and by rotation of the coin mechanism the pinion $b^2$ on the outer end of the spindle $b^1$ imparts a reduced gear drive through the reducing gear and through the differential or quantity mechanism to the valve operating mechanism. In the alternative operation with a coin such as a shilling, the striker or coin-operated lever engages both the measuring wheels $a$ and $b$ whereby the respective spindles $b^1$, $a^1$ and the gear wheels $b^2$, $e^2$ are locked, and a direct movement is imparted to the toothed wheel $f$ mounted upon the intermediate spindle $f^1$, which movement is transmitted to the differential gear. Alternatively, instead of providing for the locking of the measuring wheels together a ratchet or free wheel device may be provided whereby upon the striker engaging one of the measuring wheels, independent movement through the reducing gear is secured, while on engagement of the second measuring wheel the two measuring wheels rotate as one, thus securing a direct drive. Such a device is hereinafter described.

The differential gear, as illustrated in the accompanying drawings, consists of two co-axial sun wheels $h$, $h^1$ of which, one $h$ is secured upon the end of the intermediate spindle $f^1$, while the other $h^1$ is mounted upon a concentric but rearwardly disposed tubular sleeve $h^2$ in which is rotatably carried the spindle $h^3$ which extends forwardly into a position to be received into a central recess in the spindle $f^1$, and in a position between the toothed wheels $h$ and $h^1$ is provided with a planet wheel carrier $h^4$ upon which are mounted planet pinions $h^5$, $h^6$ in engagement with each of the sun wheels $h$ and $h^1$. By such means the drive is imparted from the intermediate spindle $f^1$ through the toothed wheel $h$ mounted at its outer end. At its rear end the spindle $h^3$ of the differential gear has mounted upon it a valve operating member or cam or the equivalent $i$ by which movement may be imparted to the meter valve lever, or alternatively the meter valve lever may be provided to be operable from the spindle $h^3$ of the differential gear through a Maltese cross device in the manner that is described and illustrated in Figures 4 and 5. Movement is imparted to the sleeve $h^2$ of the differential gear on the operation of the meter mechanism from a worm $j^1$ which engages a toothed wheel $j$ upon the differential gear sleeve $h^2$ whereby the meter valve lever may thus be returned for the closure of the valve on the operation of the meter. At the rear end the spindle $h^3$ of the differential gear may carry a pinion $k$ to engage a toothed quadrant $k^1$ by which a prepayment indicator $k^2$ may be operated. Such mechanism may also be adapted for the operation of a coin stop for excessive prepayment which is adapted to obturate the coin discharge opening of the coin holder casing. The obturator may be carried directly from the spindle $k^3$, or it may be operated from the said spindle by a contacting element or arm adapted to move the obturator rapidly into position on the discharge of the last coin representing the permissible prepayment.

The carrier for the pinions of the differential gear may be provided as a plate, arm or segment which at its outer ends may be provided to carry the respective ends of the spindles of the inter-engaging pinions. Thus, for example, two symmetrically formed plates may be provided which for the main part are secured together and at the upper ends are provided with parallel disposed outwardly extending parts serving to carry the ends of the respective spindles in such position that the respective pinions may engage one of the two toothed wheels referred to.

In the operation of the mechanism described the coin of lower value is adapted to cause the rotation of the first crown wheel and spindle by which a reduced drive is imparted through the toothed wheel and pinion of the reducing gear to the intermediate spindle, whence movement is imparted to the valve operating mechanism through the differential gear, while when the coin of higher value is used the movement of the connected crown wheels is directly communicated to the intermediate spindle and thence transmitted to the differential gear. Thus, the operating gear is alternatively used simply as a reducing gear, and means provided by which the reducing gear is locked for a direct drive from the crown wheels in the operation of the coin mechanism.

A construction of coin holder suitable for use with the coin-controlled mechanisms represented in Figures 10 to 12 is illustrated in Figures 13 to 16. The coin holder proper $a$ is conveniently provided to extend transversely and outwardly from a rotatable disc $b$ by which it is carried, and the rotatable disc $b$ is concentrically mounted at the inner face of a stationary price-changing disc $c$ which is adapted to close the open end of a cylindrical casing $e$ within which the coin holder $a$ is caused to rotate by means of an external handle $f$ applied upon a pin or the equivalent upon which the rotatable disc $b$ is mounted upon the price-changing disc $c$, the coin holder $a$ being provided of a substantially oblong cross-section with its parallel walls set apart for the accommodation between them of the coins by which the mechanism is operable. The coin holder $a$ is disposed parallel with a diametric line passing through the axis of the rotatable disc $b$ and adjacent thereto, and the rotatable disc $b$ is provided with a coin slot $b^1$ adapted to be brought into alignment on the rotation of the disc with a corresponding coin slot in the price-changing disc $c$, whereby on the alignment of the slots in the respective discs the coins may thus be laterally inserted into the coin holder $a$ so that the edge of the coin may protrude outwardly beyond the upper open end of the coin holder to contact with the inner peripheral face of the cylindrical casing $e$ in known manner.

Figure 13:
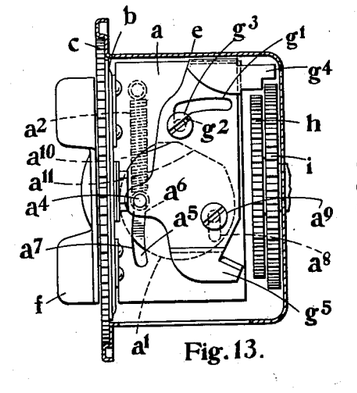
Figure 13 is a side elevation of a coin holder suitable for use with the modified coin-controlled mechanism, represented within its casing, which is shown in section.
Figure 14:
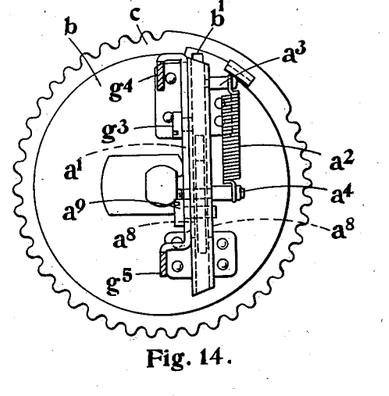
Figure 14 is a rear elevation of the coin holder and price changing disc shown in Figure 13.

A slide or coin table $a^1$ is mounted within the coin holder $a$ so as to be guided in its downward movements under the pressure of the coins inserted into the coin holder against the resistance of a helical spring $a^2$ which effects the return or upward movements. The spring is mounted adjacent the rear wall of the coin holder $a$ in a position adjacent and parallel with the rotatable disc $b$ and is connected at one end to a stationary pin $a^3$ secured in the rear wall of the coin holder near its upper end to extend outwardly therefrom, while at the other end the helical spring is secured to a pin $a^4$ mounted upon the slide $a^1$ and extending through the front and rear walls of the coin holder through coincident slots $a^5$ disposed in positions adjacent the rotating disc $b$, of which slots $a^5$ the upper parts $a^6$ are rectilinear and parallel with the rotating disc $b$, and the lower parts $a^7$ are curvilinear and so shaped as to permit the downward movement of the pin $a^4$ on the pivotal movement of the slide which occurs on the insertion of a coin of larger size into the coin holder $a$. Thus, on this further movement of the pin and slide on the insertion into the coin holder of a coin of larger size, such as a penny, the pin and slide are subject to a curvilinear movement. This movement is permitted by the rectilinear movement of the slide $a^1$ being restricted by means of coincident rectilinear slots $a^8$ provided in the front and rear walls of the coin holder $a$ near the outer edge thereof and parallel therewith and a pin $a^9$ which passes through the said slots and also passes transversely through and is carried by the slide $a^1$. The pivot pin $a^9$ is arrested in its downward movement by the bottom of the coincident slots $a^8$ and the slide $a^1$ can thus only continue its movement under the pressure of the larger coin by partially rotating about the pivot pin $a^9$ to the extent that is permitted by the lower parts $a^7$ of the slot $a^5$.

A striker plate $g$ is mounted to slide upon the outer face of the front wall of the coin holder and is connected with or secured to the slide $a^1$ within the coin holder by the pivot pin $a^9$ last referred to and by the pin $a^4$ which may be connected to a part of the striker plate $g$ that extends into a position adjacent the rotatable disc $b$.

Figure 15:
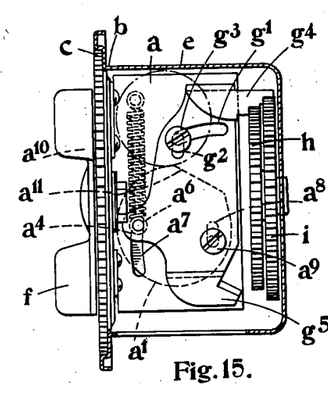
Figure 15 is a view similar to Figure 13, showing the parts as disposed when a coin of the smaller size with which the mechanism is adapted to operate is present in the coin holder.
Figure 16:
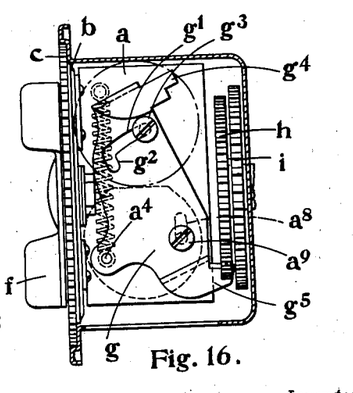
Figure 16 is a view similar to Figure 15, but showing the disposition of the parts when a coin of the larger size with which the mechanism is adapted to operate is present in the coin holder.
Figures 17, 18:
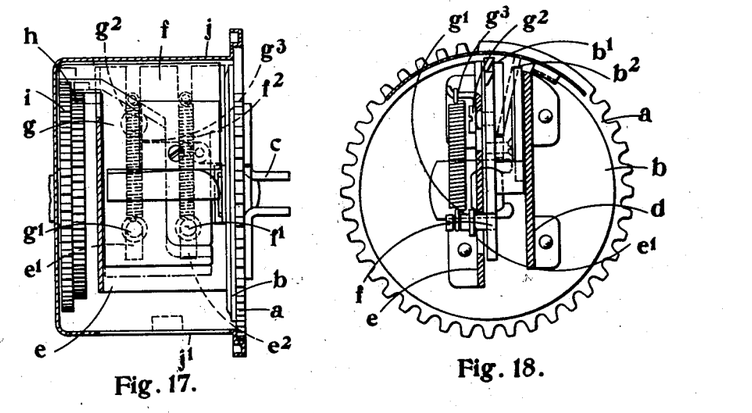
Figure 17 is a sectional side elevation of a modified coin holder mechanism for use with the modified coin-controlled mechanism.
Figure 18 is a rear elevation of the coin holder shown in Figure 17, partly in section.
Figure 19:
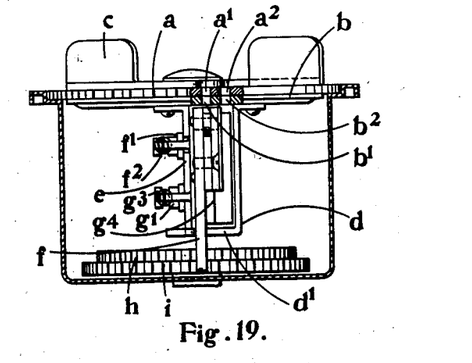
Figure 19 is a sectional plan view of the coin holder mechanism shown in Figure 17.
Figure 20:
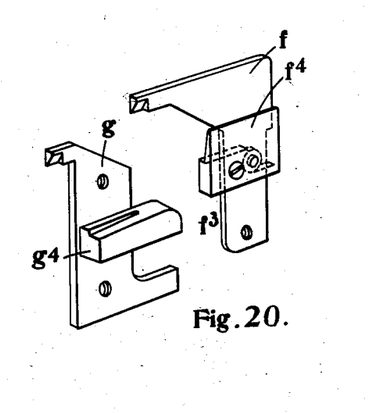
Figure 20 represents perspective views of the two strikers provided in the coin holder shown in Figure 17.

Near the upper end of the striker plate $g$ a slot $g^1$ is provided to extend across the plate and is for the main part curvilinear, corresponding to an arc of a circle struck from the axis of the pivot pin $a^9$ by which the striker plate $g$ and slide $a^1$ are connected near their lower ends and upon which they are adapted to pivot under the movement imparted to them on the insertion into the coin holder of a coin of larger size. At the inner end this curvilinear slot $g^1$ is downwardly diverted to form a rectilinear communicating part $g^2$ disposed parallel with the rotating disc $b$, and a pin $g^3$ is carried on the front wall of the coin holder $a$ to pass through the said slot and to determine the movements of the striker plate $g$. Thus, as illustrated in Figure 15, on the insertion of a shilling laterally into the coin holder $a$ a downward rectilinear movement is imparted to the slide $a^1$ and to the striker plate $g$ connected to it, so that thus a double tooth $g^4$ at the upper end of the striker plate $g$ may engage with the two juxta-posed quantity wheels $h$, $i$ of the mechanism by which on the rotation of the coin holder $a$ a direct movement is imparted to the coin controlled valve operating mechanism such as that hereinbefore described with reference to Figures 10 to 12: in this movement of the striker plate the slot $g^1$ moves relatively to the pin $g^3$ so that the pin becomes positioned in the upper end of the rectilinear part $g^2$ of the slot $g^1$. Similarly the pivot pin $a^9$ by which the striker plate $g$ and slide $a^1$ are connected moves to the lower end of the coincident rectilinear slots $a^8$ in the front and rear walls of the coin holder. If a penny be inserted, as illustrated in Figure 16, the striker plate $g$ and the slide $a^1$ first move downwardly into the final position assumed by them on the insertion of a shilling, but the slide in accommodating the larger coin continues its movement further downward, and inasmuch as the rectilinear movement of the striker plate $g$ and slide $a^1$ are determined by the coincident rectilinear slots $a^3$ in which their pivot pin $a^9$ slides, the striker plate and the slide under the further movement imposed on the introduction of the larger coin into the coin holder rotate upon the stationary pivot pin $a^9$, these movements being permitted respectively by the curvilinear parts $a^7$ of the coincident slots $a^5$ in the front and rear walls of the coin holder through which the pin $a^4$ passes and by the curvilinear part of the slot $g^1$ in the upper part of the striker plate $g$. In this operation the double tooth $g^4$ of the striker plate $g$ first engages the two adjacent quantity wheels $h$, $i$ and then recedes as shown in Figure 16 so that in the rotation of the coin holder $a$ the two quantity wheels are not engaged by it, while the lower end of the striker plate $g$ which also is formed as a tooth $g^5$ moves forward and upward along a circular path to engage the quantity wheel $h$ through which movement may be imparted to the valve operating mechanism on the rotation of the coin holder through the reducing gearing of the coin freed mechanism before referred to.

It will be understood that for operation in the manner described the slide $a^1$ is provided of a determined form at its upper part whereby on its rotation on the insertion of a coin of larger size, such as a penny, the coin is accommodated on the downward pivotal movement of the slide $a^1$ and the striker plate $g$ in the manner described. For this purpose the slide $a^1$ is provided generally of a circular or similarly curved shape particularly at its upper part, adjacent the coin slots in the coin holder and rotatable disc, against which the coins contact on their insertion into the coin holder, but beyond this circular or similarly curved part of the slide, the slide may be provided with a slight depression or cavity $a^{10}$ upon which the smaller coin, when inserted into the coin holder, may come to rest after imparting the determined downward movement to the slide $a^1$. The latter may further be formed with a straight peripheral edge $a^{11}$ which, on the increase in the depth of the coin pocket in the upper part of the coin holder produced on the partial rotation of the slide $a^1$ permits of the larger coin being completely accommodated in the coin pocket and the straight part $a^{11}$ of the peripheral edge of the slide assumes a position by which it presents to the circular edge of the larger coin on its complete entry into the coin holder a face which is substantially normal to the coin slot or the discs $b$ and $c$.

The striker plate is advantageously provided at its respective ends with the teeth $g^4$, $g^5$ integral therewith, for which purpose the metal of which the striker plate is formed is bent laterally at right angles near its upper end, and then downwardly to form at the upper part a double tooth $g^4$ in a position in a diametric plane passing through the axis of the discs $b$, $c$, the double tooth being adapted normally to extend beyond the front edge of the coin holder, so that thus in the movement imparted to it on the introduction of a coin of smaller size, the double tooth is adapted simultaneously to engage both quantity wheels $h$, $i$. For the purpose the respective engaging edges of the double tooth $g^4$ may be disposed at different levels and may be of such dimensions as may be determined by the diameter and proximity of the quantity wheels and the form and position of their teeth. At the lower end the metal of which the striker plate is formed is similarly bent laterally at right angles and again downwardly to form an integral tooth $g^5$ disposed in the diametric plane passing through the axis of the discs, and is provided of such a form as to engage with the quantity wheel $h$ when the lower end of the striker plate moves forward and upward on the insertion into the coin holder of a coin of larger size, whereby movement may be imparted to the coin operating mechanism through the reducing gearing as hereinbefore stated.

It will be understood that the pivot pin $a^9$ may advantageously be provided with a head by which the striker plate may be held in position to slide on the outer face of the front wall of the coin holder, and that similarly and for the same purpose the guiding pin $g^3$ that passes through the slot in the upper part of the striker plate may be provided with a head.

It will be understood that this construction of coin holder mechanism may be rendered suitable for use with the coin-controlled mechanism represented in Figures 1 to 5 by the formation of the double tooth $g^4$ as a single tooth to engage only the measuring wheel $i$.

Another construction of coin holder suitable for use, for example, with the mechanism represented in Figures 10 to 12 is represented in Figures 17 to 20. In this construction the price changing disc $a$ is provided in determined position with two parallel and juxtaposed slots of sizes corresponding respectively to shilling and penny, similar slots $b^1$, $b^2$, or an aperture being provided in the disc $b$ forming part of the coin holder that is disposed on the inner face of the price changing disc, it being understood that the coin holder is concentrically mounted upon the price changing disc and is adapted in known manner to be rotated by means of a handle $c$, mounted externally to the price changing disc. The coin holder may in known manner comprise two parallel disposed plates $d$, $e$ that extend outwardly from the disc $b$ and are set in position transversely across the face of the disc at positions near a diametric line, the plates being conveniently diverted at right angles at one end for the formation of lugs by which the plates may be secured to the outer face of the disc $b$, while at the opposite or outer end one of the plates $d$ may be bent to form an end wall $d^1$ for engagement with the other, and thus form a rectangular cavity within which the strikers $f$, $g$ may be mounted to slide lengthwise and in planes parallel and adjacent to that in which the axis of the coin holder lies. The strikers may advantageously be provided to lie in the same plane, being for the main part of their length of a width approximately equivalent to one-half the width of the cavity within the coin holder, and being respectively adapted to move transversely to the axis of the coin holder by means of pins $g^1$, $f^1$ passing respectively through slots $e^1$, $e^2$ in vertical line provided in the one wall $e$ of the coin holder, the slots being provided in line transversely to the axis of the coin holder. The striker $g$ is further constrained to move transversely to the axis of the coin holder by a second pin $g^2$ which also passes transversely through a slot in the wall $e$ of the coin holder. The striker $f$ is constrained to a similar movement by reason of its shape relatively to that of the striker $g$ and the relative disposition of the two strikers in the coin holder. The pins $g^1$, $f^1$ serve for the engagement of the lower ends of corresponding helical springs $g^3$, $f^2$, the upper end of each of which may be engaged upon a pin secured to or integral with the wall of the coin holder near the opposite end, so that thus the respective strikers may normally be maintained in their outermost position respectively out of engagement with the quantity wheels $h$, $i$. The striker $f$ that is adapted to be actuated by a shilling is of slightly greater length than the striker $g$ that is adapted to be actuated by a penny, so that thus the shilling striker at its upper end extends over the penny striker and forms an outwardly extending arm or pawl. Thus the arm or pawl of the shilling striker $f$ extends outwardly from the end wall of the coin holder to engage the larger and outermost quantity wheel $i$, while the penny striker $g$ which is disposed adjacent the end wall, is at its upper end provided with a shorter striker arm or pawl that is adapted to engage the adjacent smaller quantity wheel $h$. The shilling striker $f$ is provided with a transversely disposed part $f^3$ in a determined position which is conveniently provided with a groove for the reception of the lower edge of the shilling coin on its introduction through the slot in the price changing disc, and this transversely disposed part is normally disposed above a corresponding transversely disposed part $g^4$ immediately beneath and carried by the penny striker $g$. These respective transversely disposed parts it will be understood form the bottom of the adjacent coin pockets respectively for the coins of higher and lower value. The part $g^4$ is provided of greater thickness than the part $f^3$ and corresponding approximately to the width of the coin holder pocket, so that a penny may rest thereon at the side of the part $f^3$. Inasmuch as the transversely disposed part $g^4$ forming the bottom of the pocket for the coin of lower value is disposed immediately beneath and in contact with the transversely disposed part $f^3$ forming the bottom of the pocket for the coin of higher value, it will be understood that when the coin of a higher value is introduced into the coin holder both strikers are caused to move downwards or inwards to engage the respective quantity wheels. Furthermore it will be understood that the penny striker at its upper end lies immediately beneath the over-hanging part of the shilling striker, and thus any movement imparted to the shilling striker is necessarily imparted to the penny striker.

In operation, it will be understood that by inserting a penny, for example, through the appropriate slot and into the appropriate coin pocket, the penny striker $g$ is depressed, so that its outwardly extending arm engages the appropriate quantity wheel $h$, and the penny remains parallel within the pocket until the coin is ejected through the discharge slot $j^1$ in the lower part of the casing $j$ at which time the striker is also disengaged from the quantity wheel. Furthermore the transversely disposed part $f^3$ of the striker $f$ is provided with a laterally disposed upstanding portion $f^4$ defining the coin space and having the inner face inclined or bevelled outwardly. By inserting a shilling, for example, through the appropriate slot and into the appropriate coin pocket, both the shilling and penny strikers are depressed, whereby both the adjacent quantity wheels are engaged and as the coin holder is thereupon rotated the coin does not remain parallel with the pocket but being held against the inner periphery of the casing by reason of the effect of the helical springs by which the respective strikers are subject, the coin is tilted into a position in which it lies against the inclined surface of the portion $f^4$ with its outer edge in contact with the side of the adjacent penny pocket. The quantity wheels are thus rotated to an extent corresponding to that by which one of the wheels would be moved on actuation of the mechanism with a penny and the strikers disengage from the quantity wheels at exactly the same position on reaching the discharge slot $j^1$ in the lower part of the casing $j$ as in the case on actuation by a penny.

Figure 21:
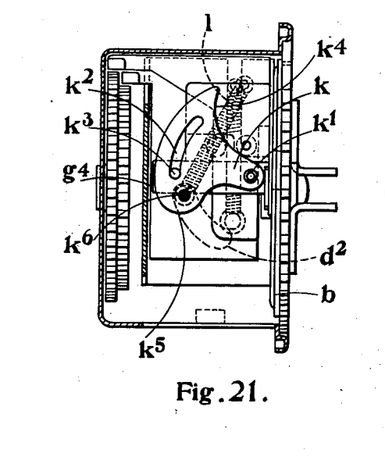
Figures 21, 22 and 23 are views corresponding to Figures 17, 18 and 19 of a modified construction of coin holder mechanism.
Figure 22:
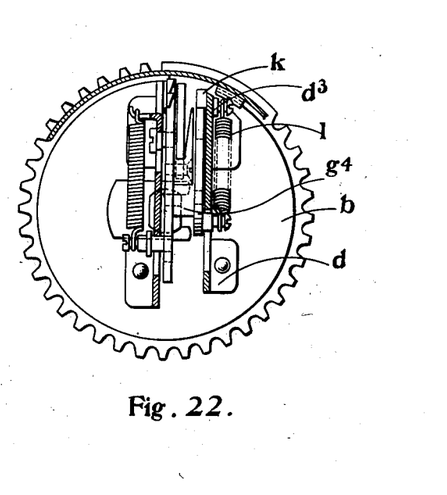
Figure 23:
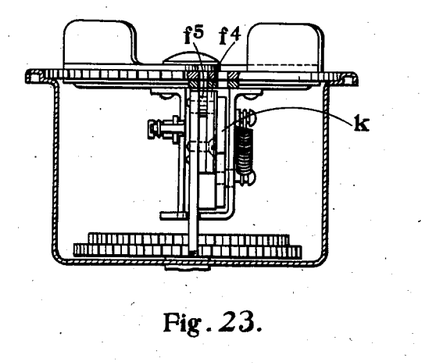

The construction represented in Figures 21–23 follows closely that hereinbefore described with reference to Figures 17 to 20, but is modified to the extent necessary to permit the provision of means whereby the rejection from the coin holder of a coin of small size accidentally inserted into the slot intended for coins of large size may be ensured. The transversely disposed part $g^4$ carried by the penny striker $g$ is reduced in thickness to the extent corresponding to the width of the coin pocket or coin space required to receive a penny, and upon the said part there is pivotally mounted the movable or ejector element $k$ which serves to take the place of the portion of the transversely disposed part that has been omitted. The movable or ejector element is conveniently provided as a sector-like plate that is pivoted at $k^1$ to the transversely disposed part in a position adjacent the disc $b$ by which the coin holder is carried. The angular movement of the said element about its pivotal point is determined by a slot $k^2$ struck about the pivotal point as centre, which slot engages a pin $k^3$ also mounted in the transversely disposed part before referred to. The form of the upper or operative edge $k^4$ of the element $k$ is such that when it is depressed to the full extent permitted by the slot and pin the forward part of the upper or operative edge comes to lie flush with the upper surface of the transversely disposed part and the rear part of the said edge curves upwardly with a curvature and in a position that will cause no obstruction to the insertion of a penny within the slot.

An extension $k^5$ of the element below the pivotal point and the slot $k^2$ serves to carry a pin $k^6$ which extends outwardly through the adjacent wall of the coin holder through a slot $d^2$ which follows approximately a curvature struck about the pivotal point of the movable or ejector element as a centre and of a width to accommodate the movement of the pin projecting therethrough resulting from the movement of the penny striker $g$ on the insertion of a penny into the corresponding coin pocket or coin space. The said pin serves for the connection of a helical tension spring $l$, the free end of which is anchored to a pin $d^3$ disposed towards the upper end and on the outside of the adjacent wall $d$ of the coin holder. The action of the spring thus serves normally to maintain the movable or ejector element $k$ in its uppermost position in which the lower end of the slot $k^2$ therein engages the cooperating pin $k^3$ carried by the transversely disposed part $g^4$ of the penny striker and in which the upper or operative edge $k^4$ of the movable or ejector element $k$ is now disposed as an inclined or curved surface extending upwardly in the interior of the coin pocket. Thus, on the introduction of a shilling or a coin smaller than a penny, the movable or ejector element is not depressed to the extent necessary to bring the forward part of the operative or upper edge flush with the transversely disposed part of the penny striker and thus by the action of the spring $l$ the element is returned to its upper position with the consequent ejection of the coin. When, however, a penny or the coin for which the slot is intended is introduced into the coin pocket of the coin space, the element is depressed to the extent that the upward reaction is diametrically opposed to the pressure exerted upon the coin by the casing of the coin holder. The coin is thus in a stable position and no tendency exists for its ejection.

Since the action of the helical tension spring $l$ is to raise the movable or ejector element to its uppermost position in which the pin $k^3$ engaged in the slot $k^2$ of the element is disposed at the lower end of the slot, the spring serves also for the purpose of maintaining the penny striker $g$ in the uppermost position. The helical spring $g^3$ and pins $g^1$, $g^2$ provided for this purpose according to the construction described with reference to Figures 17 to 20 may therefore be omitted.

The transversely disposed part $f^3$ of the shilling striker $f^2$ is also provided on the outer side with an upwardly extending wall $f^4$ serving to define the corresponding wall of the penny coin pocket or coin space, the said upwardly extending wall having an inclined inner face to permit the shilling or like small coin when introduced into its slot to tilt over in the operation of the coin holder so that its upper or outer edge may occupy substantially the same position as that of a penny or corresponding coin disposed in the penny coin pocket or coin space. At its forward end, also, the transversely disposed part $f^3$ of the shilling striker is advantageously recessed to receive a roller $f^5$ which facilitates the entry of a coin into the corresponding coin pocket or recess.

It will be understood that the invention is not limited to the details of construction hereinbefore described, since these may be varied without departing from the scope of the invention as hereinbefore set forth and that the rejector element may be applied to coin holder mechanisms other than those described where possible and suitable.

Figure 24:
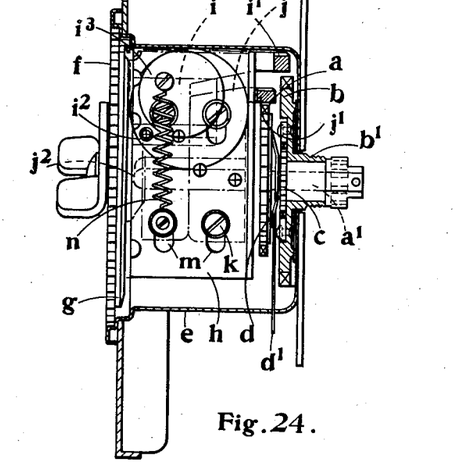
Figure 24 is a longitudinal section of a coin holder mechanism provided with a ratchet or free wheel connection between the measuring wheels, according to the invention.
Figure 25:
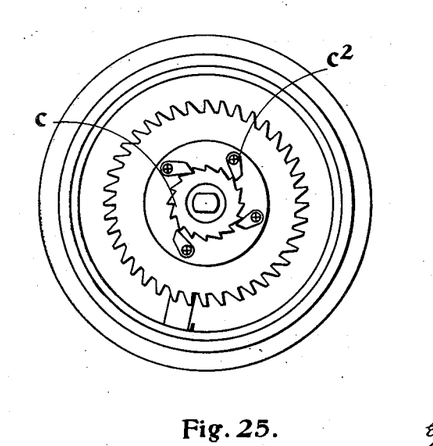
Figure 25 is a view in elevation of the larger quantity or measuring wheel and the free wheel or ratchet and pawl device of the mechanism shown in Figure 24.

The modified coin controlled mechanism may be operated from measuring wheels inter-connected by a ratchet or free wheel device so that a coin holder with independently operating strikers may be used while at the same time the measuring wheels are locked together for one of the drives. A construction of ratchet and pawl or free wheel mechanism is illustrated in Figures 24 and 25 of the drawings. The quantity or measuring wheels $a$, $b$ are disposed in juxta-position, the smaller $a$ which is adapted to be actuated by the coin mechanism on the insertion of a coin of lower value being mounted upon or rendered integral with a central spindle $a^1$, while the quantity or measuring wheel $b$ which is actuated by the mechanism on the insertion into the coin holder of a coin of higher value is mounted upon or rendered integral with a tubular sleeve $b^1$ concentrically mounted with reference to the spindle $a^1$ before referred to.

The free wheel device comprises a ratchet wheel $c$ mounted by means of a sleeve $c^1$ in fixed relation to the central spindle $a^1$ in such position that when the parts are assembled it comes to lie between the quantity or measuring wheels $a$, $b$. The spindle $a^1$ is conveniently formed with two flat surfaces while the bore of the sleeve $c^1$ is formed correspondingly. A plurality of pawls $c^2$ are mounted upon the larger quantity or measuring wheel $b$ in such relative disposition that they are adapted to engage the ratchet wheel alternately, that is to say, so that no more than one pawl is at any time in engagement with the teeth of the ratchet wheel.

It will be understood that in the operation of the mechanism on the engagement of the coin mechanism with the quantity or measuring wheel $b$ in the use of a coin of higher value, the quantity or measuring wheel $b$ is directly engaged and its movement is communicated to the adjacent quantity or measuring wheel $a$ through the ratchet wheel $c$ and pawls $c^2$, while in the operation of the mechanism, in the use of a coin of lower value the quantity or measuring wheel $a$ is directly engaged and no movement is imparted to the quantity or measuring wheel $b$ which is subjected to sufficient friction applied, for example, by way of a spring washer, for it to be held stationary. A spring washer $d$ is advantageously disposed between the quantity or measuring wheel $a$ and the ratchet wheel $c$ and is anchored against rotation by a lug or extension $d^1$ which engages a slot or stop in the coin holder casing $e$.

It will be understood further that the coin holder mechanism that is provided to effect the rotation of the quantity or measuring wheels may be of any suitable construction serving alternately for the engagement of the quantity or measuring wheels $a$, $b$ according as a coin of lower or higher value is inserted in the coin holder.

As illustrated in the accompanying drawings the adjustable price-change disc $f$ supports a rotatable disc $g$ forming the front plate of the coin holder which is completed by a casing $h$ substantially U-shaped in cross section and mounted at the rear of the said rotatable disc $g$ diametrically or parallel with the diameter. The price-change disc $f$ and the rotatable disc $g$ are provided with coin slots disposed side by side and respectively adapted for the reception of the coins of higher and lower value, whereby the coins are introduced into corresponding coin pockets within the coin holder. Separate slidable striker plates $i$, $j$ are provided for each coin, such striker plates lying side by side against one of the walls of the coin holder casing $h$ to which they are attached by means of screw pins $k$ engaging slots $m$ in the wall of the coin holder, which slots are disposed parallel with the rotatable disc. The striker plates $i$, $j$ are respectively extended through the rear of the coin holder and are there formed as teeth $i^1$, $j^1$ for the engagement respectively of the quantity or measuring wheels $a$, $b$. As will be observed from Figure 1 the extension of the striker plate $i$ lies above the upper end and extension of the striker plate $j$. The striker plate $j$ is provided with a coin platform $j^2$ secured to its outer face and extending from the front to the rear of the coin holder. Such coin platform is of a width sufficient to extend across the width of the coin holder casing and to serve for the reception of a coin introduced into the slot in the price-change disc far removed from the striker plate. The striker plate $i$ is similarly provided with a coin platform $i^2$ disposed above the coin platform $j^2$ of the striker plate $j$ and serves for the reception of the coin of higher value. The said coin platform $i^2$ is provided with an upwardly extending wall $i^3$ on the outer face which forms a boundary to the coin pocket for the coin of lower value which is adapted to be received upon the coin platform $j^2$. Each of the striker plates $i$, $j$ is mounted under the action of a tension spring $n$ as illustrated in respect of the striker plate $i$ for the purpose of maintaining the corresponding striker plate in the uppermost position within the coin holder. The said coin holder mechanism is similar in its main features to those represented in Figures 17 to 23.

It will be understood that the invention is not limited to the details of construction hereinbefore described nor to the application of the free wheel or ratchet device in conjunction with any particular construction of coin holder mechanism.

We claim:—

1. Prepayment mechanism for the control of the supply of gas, electricity and like commodities, comprising a coin holder casing, a coin holder within said casing adapted for a rotary movement and to receive coins of more than one size, a plurality of measuring wheels, means carried by the said coin holder selectively to engage said measuring wheels according to the size of the coin inserted into the coin holder, a differential quantity mechanism consisting of two sun wheels, planet pinions co-operating with the said sun wheels, and a carrier for the said planet pinions, an epicyclic reduction gear connecting said measuring wheels with said quantity mechanism and transmitting rotational movement of the measuring wheels to one of the sun wheels of the quantity mechanism as a movement the angular extent of which is in proportion to the size of the coin inserted into the coin holder, means related to the planet carrier for operating a commodity supply control element, and means for transmitting return motion to the quantity mechanism through the second sun wheel of the quantity mechanism from a metering mechanism.

2. Prepayment mechanism for the control of the supply of gas, electricity and like commodities, comprising a coin holder casing, a coin holder within said casing adapted for a rotary movement and to receive coins of more than one size, a plurality of measuring wheels, means carried by the said coin holder selectively to engage said measuring wheels according to the size of the coin inserted into the coin holder, a differential quantity mechanism consisting of two sun wheels, planet pinions co-operating with the said sun wheels, and a carrier for the said planet pinions, an epicyclic reduction gear connecting said measuring wheels with said quantity mechanism and consisting of two co-axial and independent sun wheels, a planet carrier and planet wheels co-operating with said sun wheels, said epicyclic reduction gear transmitting rotational movement of the measuring wheels to one of the sun wheels of the quantity mechanism as a movement the angular extent of which is in proportion to the size of the coin inserted into the coin holder, means related to the planet carrier for operating a commodity supply control element, and means for transmitting return motion to the quantity mechanism through the second sun wheel of the quantity mechanism from a metering mechanism.

3. Prepayment mechanism for the control of the supply of gas, electricity and like commodities, comprising a coin holder casing, a coin holder within said casing adapted for a rotary movement and to receive coins of more than one size, a plurality of measuring wheels, means carried by the said coin holder selectively to engage said measuring wheels according to the size of the coin inserted into the coin holder, a differential quantity mechanism consisting of two sun wheels, planet pinions co-operating with the said sun wheels, and a carrier for the said planet pinions, an epicyclic reduction gear connecting said measuring wheels with said quantity mechanism and consisting of a sun wheel and a sun pinion which are co-axial and independent, a planet carrier and a planet pinion and planet wheel co-axially disposed and in fixed relation and respectively geared with the sun pinion and the sun wheel, the planet carrier being adapted to rotate upon the common axis of the sun wheel and the sun pinion, the said epicyclic reduction gear transmitting rotational movement of the measuring wheels to one of the sun wheels of the quantity mechanism as a movement the angular extent of which is in proportion to the size of the coin inserted into the coin holder, means related to the planet carrier for operating a commodity supply control element, and means for transmitting return motion to the quantity mechanism through the second sun wheel of the quantity mechanism from a metering mechanism.

4. Prepayment mechanism for the control of the supply of gas, electricity and like commodities, comprising a coin holder casing, a coin holder within said casing adapted for a rotary movement and to receive coins of more than one size, a plurality of measuring wheels, means carried by the said coin holder selectively to engage said measuring wheels according to the size of the coin inserted into the coin holder, a differential quantity mechanism consisting of two sun wheels, planet pinions co-operating with the said sun wheels, and a carrier for the said planet pinions, an epicyclic reduction gear connecting said measuring wheels with said quantity mechanism and transmitting rotational movement of the measuring wheels to one of the sun wheels of the quantity mechanism as a movement the angular extent of which is in proportion to the size of the coin inserted into the coin holder, a Maltese cross gear, the driving element of which is in fixed relation to and rotates with the planet carrier of the differential quantity mechanism, a member for operating a commodity supply control element, which member is in fixed relation to and rotatable with the driven element of the Maltese cross gear, and means for transmitting return motion to the quantity mechanism through the second sun wheel of the quantity mechanism from a metering mechanism.

5. Prepayment mechanism for the control of the supply of gas, electricity and like commodities, comprising two co-axial and juxtaposed measuring wheels, a coin holder adapted for rotary movement about the axis of the measuring wheels and to receive coins of more than one size, an abutment, such as a casing for the coin holder, and a pivoted contact member within the said coin holder between which the inserted coin engages, the said contact member being rotated to a degree determined by the size of the coin, a striker plate within said coin holder coupled to said contact member and constrained in executing its full movement selectively to engage first one and then the other measuring wheel, and a spring returning said striker plate and contact member to the initial positions, a differential quantity mechanism consisting of two sun wheels, planet pinions co-operating with the said sun wheels, and a carrier for the said planet pinions, an epicyclic reduction gear connecting said measuring wheels with said quantity mechanism and transmitting rotational movement of the measuring wheels to one of the sun wheels of the quantity mechanism as a movement the angular extent of which is in proportion to the size of the coin inserted into the coin holder, means related to the planet carrier for operating a commodity supply control element, and means for transmitting return motion to the quantity mechanism through the second sun wheel of the quantity mechanism from a metering mechanism.

6. Prepayment mechanism for the control of the supply of gas, electricity and like commodities, comprising a coin holder casing, a coin holder within said casing adapted for rotary movement and to receive coins of more than one size, a plurality of measuring wheels, means carried by the said coin holder selectively to engage said measuring wheels according to the size of the coin inserted into the coin holder, a differential quantity mechanism, an epicyclic reduction gear connecting said measuring wheels with said quantity mechanism and consisting of two sun wheels, a planet carrier and a planet pinion and planet wheel coaxially disposed and in fixed relation and geared with the respective sun wheels, the planet carrier being adapted to rotate upon the common axis of the sun wheels and the said epicyclic reduction gear operating to transmit rotational movement of the measuring wheels to the quantity mechanism as a movement the angular extent of which is in proportion to the size of the coin inserted into the coin holder, means related to the differential quantity mechanism for operating a commodity supply control element, and means for transmitting return motion through the quantity mechanism from a metering mechanism.

7. Prepayment mechanism for the control of the supply of gas, electricity and like commodities, comprising a coin holder casing, a coin holder within said casing adapted for a rotary movement and to receive coins of more than one size, a plurality of measuring wheels, means carried by said coin holder selectively to engage said measuring wheels according to the size of the coin inserted into the coin holder, a differential quantity mechanism consisting of two sun wheels, planet pinions cooperating with the said sun wheels, and a carrier for the said planet pinions, an epicyclic reduction gear connecting said measuring wheels with said quantity mechanism and consisting of two coaxially and independent sun wheels, a planetary carrier and planetary wheels cooperating with said sun wheels, said epicyclic reduction gear operating to transmit rotational movement of the measuring wheels to one of the sun wheels of the quantity mechanism as a movement the angular extent of which is in proportion to the size of the coin inserted into the coin holder, means related to the planet carrier of the quantity mechanism for operating a commodity supply control element, and means for transmitting return motion to the quantity mechanism from a metering mechanism.

8. Prepayment mechanism for the control of the supply of gas, electricity and like commodities, comprising two coaxially and juxtaposed measuring wheels, a rotary coin holder adapted to receive coins of more than one size, an abutment, such as a casing for the coin holder, and a pivoted contact member within the said coin holder between which the inserted coin engages, the said contact member being rotated to a degree predetermined by the size of the coin, means carried by the coin holder and coupled to the contact member for selectively operating the measuring wheels, a spring for returning said means and contact member to their initial positions, a differential quantity mechanism consisting of two sun wheels, planet pinions cooperating with the said sun wheels, and a carrier for the said planet pinions, an epicyclic reduction gear connecting said measuring wheels with said quantity mechanism and transmitting rotational movement of the measuring wheels to one of the sun wheels of the quantity mechanism as a movement, the angular extent of which is in proportion to the size of the coin inserted into the coil holder, means related to the planet carrier for operating a commodity supply control element, and means for transmitting return motion to the quantity mechanism through the second sun wheel of the quantity mechanism from a metering mechanism.

9. Prepayment mechanism for the control of the supply of gas, electricity and like commodities, comprising a plurality of measuring wheels, coin controlled means to selectively engage and operate said measuring wheels according to the size of the coin used, a differential quantity mechanism, an epicyclic reduction gear connecting said measuring wheels with said quantity mechanism for transmitting rotational movement of the measuring wheels to said quantity mechanism as a movement the angular extent of which is in proportion to the size of the coin used, means related to the quantity mechanism for operating a commodity supply control element, and means for transmitting return motion to the quantity mechanism from a metering mechanism.

10. Prepayment mechanism for the control of the supply of gas, electricity and like commodities, comprising a plurality of measuring wheels, coin controlled means to selectively engage and operate said measuring wheels according to the size of the coin used, a differential quantity mechanism consisting of a pair of sun wheels, planet gears cooperating with the said sun wheels, and a carrier for the said planet gears, an epicyclic reduction gear coupling said measuring wheels with said quantity mechanism for transmitting rotational movement of the measuring wheels to one of the sun wheels of the quantity mechanism as a movement the angular extent of which is in proportion to the sizes of the coin used, means related to the planet carrier for operating a commodity supply control element, and means for transmitting return motion to the quantity mechanism through the second sun wheel of said quantity mechanism from a metering mechanism.

ERNEST WILLIAM SMITH.
ARTHUR CHARLES.